United States Patent
Förborgen

(10) Patent No.: US 6,374,941 B1
(45) Date of Patent: Apr. 23, 2002

(54) VEHICLE POWER STEERING SYSTEM WITH DIGITAL ANGLE SENSING DEVICE

(75) Inventor: Carl Erik Mikael Förborgen, Tyresö (SE)

(73) Assignee: Inmotion Technologies AB, Stockholm (SE)

( * ) Notice: Subject to any disclaimer, the term of this patent is extended or adjusted under 35 U.S.C. 154(b) by 0 days.

(21) Appl. No.: 09/607,566

(22) Filed: Jun. 29, 2000

(30) Foreign Application Priority Data

Jul. 2, 1999 (SE) .............................................. 9902537

(51) Int. Cl.[7] ................................................ B62D 5/04
(52) U.S. Cl. ........................... 180/444; 180/446; 701/41
(58) Field of Search ................................ 180/402, 403, 180/412, 413, 422, 443, 445, 446; 701/43, 41, 42; 73/1.75, 1.01, 763

(56) References Cited

U.S. PATENT DOCUMENTS

| | | | |
|---|---|---|---|
| 5,201,380 A | * | 4/1993 | Callahan |
| 5,440,487 A | * | 8/1995 | Althoff et al. |
| 5,777,223 A | * | 7/1998 | Kohrt |
| 6,047,229 A | | 4/2000 | Ishikawa |
| 6,219,604 B1 | * | 4/2001 | Dilger et al. ................. 701/41 |

FOREIGN PATENT DOCUMENTS

EP        0885756        12/1998

* cited by examiner

*Primary Examiner*—Annie Marie Boehler
(74) *Attorney, Agent, or Firm*—Frishauf, Holtz, Goodman, Langer & Chick, P.C.

(57) ABSTRACT

A power steering system for a vehicle which has one or more steerable wheels (10) includes a manually operable steering wheel (12), a first angle sensing device (16) connected to the steering wheel (12), a servo motor (13) connected to the steering wheel or wheels (10), associated with the servo motor (13), and a control unit (17) for receiving signals from the first angle sensing device (16) and for energizing the servo motor (13). The first angle sensing device (16) includes a single digital angle encoder fed with a constant supply voltage (VCC) by the control unit (17), and generates electric pulses of a certain amplitude ($\Delta V_1$) The control unit (17) includes a malfunction detecting device connected to the angle encoder (16), and the angle encoder (16) includes a circuit for establishing a constant analog voltage for reducing the pulse amplitude ($\Delta V_1$) normally delivered by the angle encoder (16) to a suitable check amplitude ($\Delta V_2$)

8 Claims, 2 Drawing Sheets

140
VEHICLE POWER STEERING SYSTEM WITH DIGITAL ANGLE SENSING DEVICE

The invention relates to a power steering system for a vehicle having one or more steerable wheels, and which comprises a manually operable steering wheel, a first angle sensing device connected to the steering wheel, a servo motor connected to the steerable wheel or wheels and including a second angle sensing device, and a control unit for receiving signals from the first angle sensing device and for energizing the servo motor.

BACKGROUND OF THE INVENTION

In prior art systems of this kind, there are used analog types of angle sensing means like potentiometers or DC-tachometers connected to the steering wheel. In those systems, it is fairly simple to obtain a reliable safety control of the angle sensing device operation. Such a safety control is hightly important, since it is crucial for the safety of the vehicle operation.

For different reasons it has become desirable to use digital angle sensing devices instead of the former analog devices both as a steering wheel signal producer and as an angle controlling device at the steerable wheel of the vehicle, and according to one previously suggested solution to the safety problem two separate digital angle encoders have been used. A faulty operation of one of these encoders indicates a malfunction to be attendted to, but because two encoders are provided, the steering system would remain operative to enable a safe handling of the vehicle to stand still.

It is desirable, however, to simplify the power steering system and to bring down its costs, and a solution to that would be to use just one digital angle encoder. There is a problem, though, to accomplish a reliable detection of a faulty operation of such system and to initiate an immediate stop to the vehicle operation.

In a power steering analog system described in EP 0 885 756, there are used analog type angle sensors in connection with the steerable wheels of the vehicle, and there is also described a method for faulty detection of these sensors.

However, in this known system there is used a digital angle encoder as a signal generating means in connection with the steering wheel. However, there is not described or mentioned anything about how to accomplish a reliable function monitoring of this digital angle encoder.

SUMMARY OF THE INVENTION

According to the invention, a power steering system for a vehicle having one or more steerable wheels comprises a steering wheel which is mechanically connected to a single digital angle encoder, a servo motor with an angle sensing device connected to the steerable wheels, and a malfunction detecting device connected to the digital angle encoder and arranged to apply a constant analog voltage across the digital encoder to, thereby, alter the digital pulse amplitude from the encoder to a certain check amplitude, wherein a faulty angle encoder operation is detectable as a deviation of the pulse amplitude from that check amplitude.

The above described problems are solved by the invention which provides an improved power steering system including a simplified but safely controlled digital angle sensing device.

A preferred embodiment of the invention is described below with reference to the accompanying drawings.

DETAILED DESCRIPTION

Figure 1:
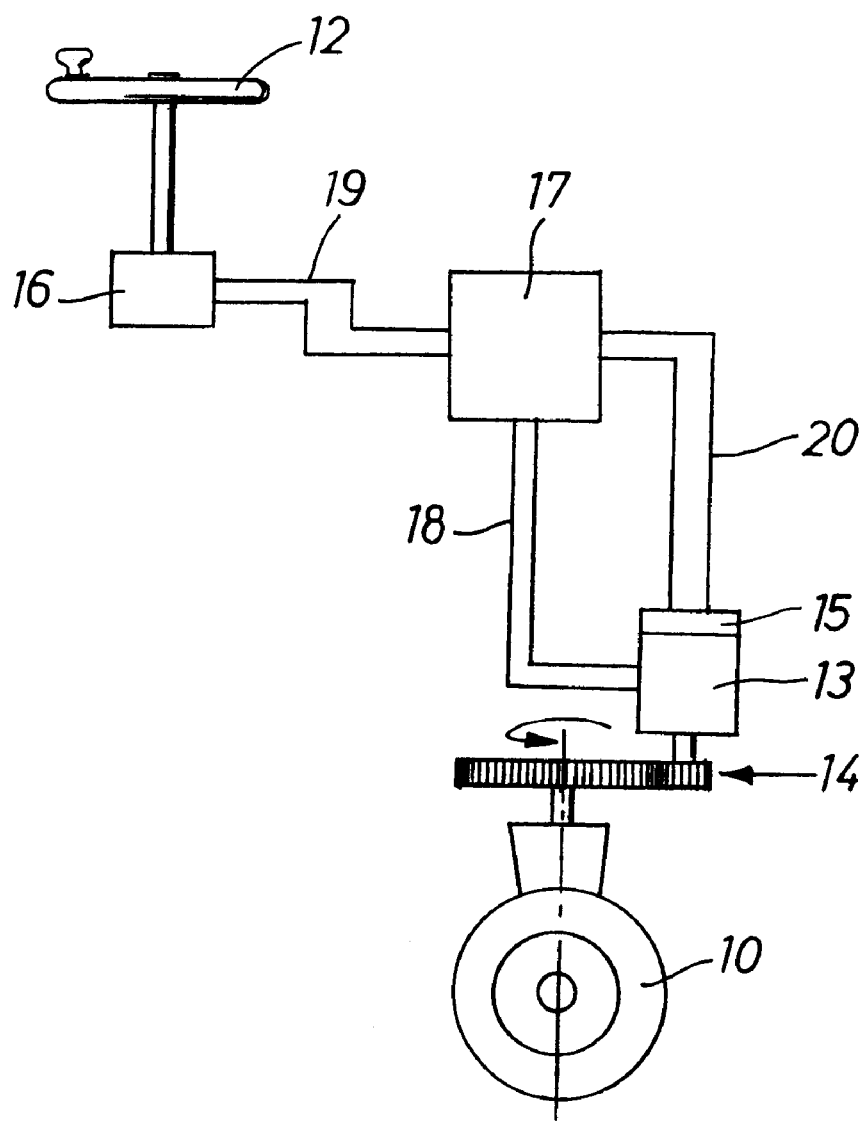
FIG. 1 shows schematically an example of a power steering system according to the invention.

The power steeing system shown in FIG. 1 is applied to a vehicle having one steerable wheel 10, a steering wheel 12 for manual operation of the system, a servo motor 13 mechanically coupled to the steerable wheel 10 via a gear mechanism 14, an angle sensing device 15 associated with the servo motor 13, an angle encoder 16 mechanically connected to the steering wheel 12, and a control unit 17. The control unit 17 comprises electronic data processing components as well as power supply means and communicates with the servo motor 13 via wiring 18 for supply of electric power to the motor 13 and with the angle encoder 16 and the angle sensing device 15 via wirings 19 and 20, respectively.

The angle encoder 16 connected to the steering wheel 12 is of a digital type delivering a train of electrical pulses when turning the steering wheel 12, and the angle sensing device 15 associated with the motor 13 is preferably arranged to deliver feed back pulses to the control unit 17 so as to obtain a correlation between the set pulse number and frequency delivered by the angle encoder 16 and the actual pulse number and frequency delivered by the angle sensing device 15. The pulse frequency corresponds to the rotation speed of the steering wheel 12 and the servo motor 13.

The angle encoder 16 is of the double-channel type, wherein the two channels are arranged at a 90 degree phase displacement for obtaining a signal pattern indicating the actual direction of movement.

The angle encoder 16 is fed with a constant supply voltage VCC by the control unit 17, and normally, the pulses delivered by an angle encoder of the digital type have an amplitude $\Delta V_1$ extending from zero to a certain level, for instance 0–12 V. This means that if you are going to check the encoder device for discovering any malfunction you can get either 0 V or 12 V, which means that 0 V could be either o.k. or indicate a broken connection, and 12 V could indicate o.k. or short circuiting.

However, by mixing the digital signal from the angle encoder 16 with a constant analog voltage it is possible to obtain a check amplitude $\Delta V_2$ of for example 2–10 V. This means that if you get a reading of at least 2 V when checking the encoder operation you know that there is not broken connection, and if you get a reading of no more than 10 V you can be certain that there is no short circuiting in the encoder circuit.

Alternatively, the check $\Delta V_2$ could be 0.5–4.5 V which is a reduction of the original pulse amplitude of 0 V–5 V. None of the two latter readings would give any information about the operation order of the angle encoder 16, unless the reduced check amplitude is provided by the addition of the constant analog voltage.

For accomplishing this, the system includes a circuit (not illustrated) for generating the constant analog voltage. Preferably, this is accomplished by a circuit comprised in the angle encoder 16. Such an arrangement results in a simplified wiring between the angle encoder and the control unit 17.

Figure 2:
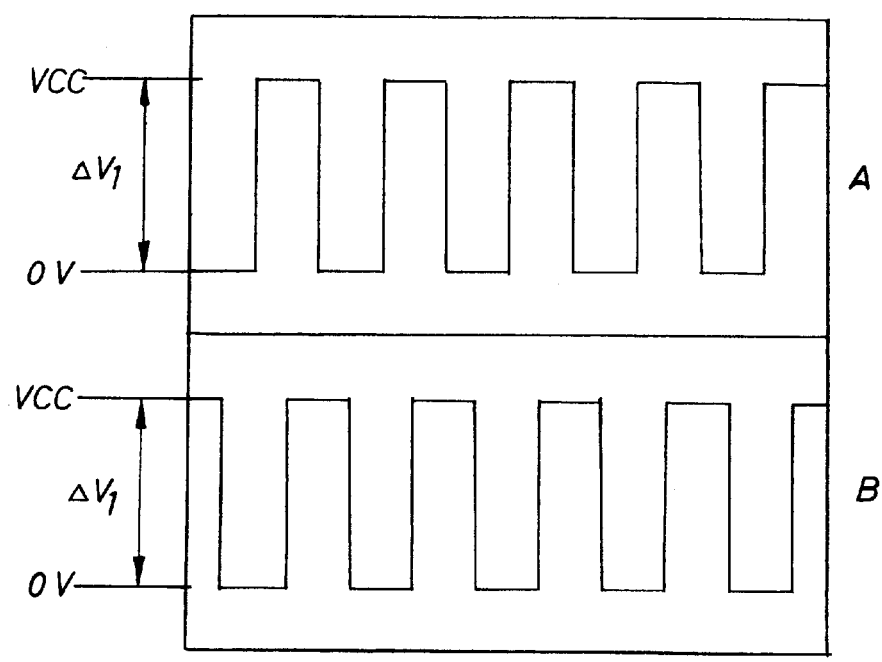
FIG. 2 shows unaltered amplitude pulse trains from the digital angle encoder.

In FIG. 2, there are illustrated the delivered pulse trains of the two channels A and B of the digital encoder 16 where no mixing is made with an analog constant voltage. In this case, the pulse amplitude $\Delta V_1$ is the original amplitude delivered by the digital encoder 16.

Figure 3:
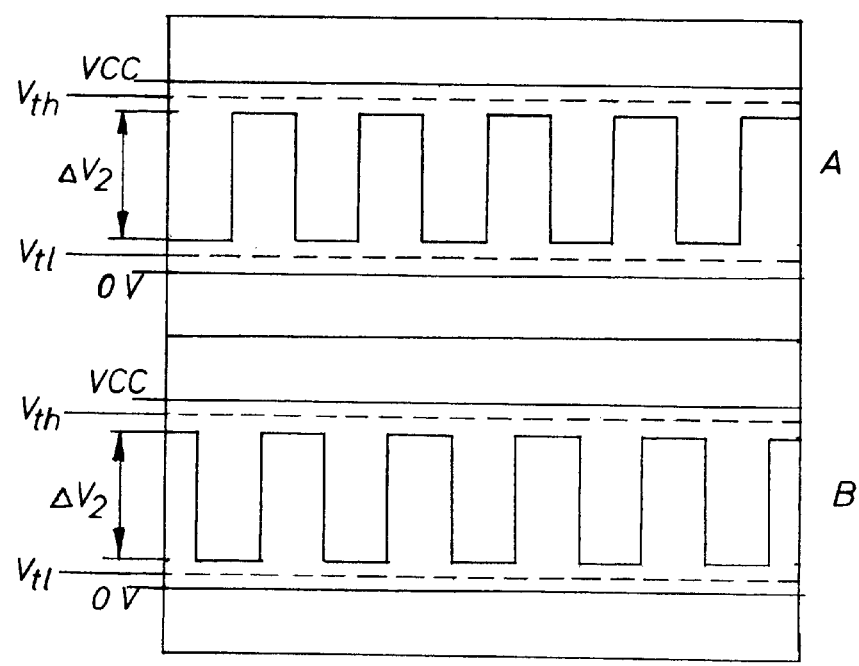
FIG. 3 shows pulse trains from the digital angle encoder with altered amplitude.

In FIG. 3, there is shown a diagram illustrating the delivered pulse trains from the two encoder channels A and B where an analog constant voltage has been added, whereby the pulse amplitude $\Delta V_1$ has been reduced to $\Delta V_2$ which is used as a check amplitude for function check of the digital encoder 16.

By mixing a constant analog voltage with the digital pulses delivered by the angle encoder 16, as described above, the bottom voltage level of each pulse is raised from the zero level and the top voltage level of each pulse is reduced from the supply voltage level VCC.

The malfunction detecting device included in the control unit 17 comprises a means for providing high and low trip levels outside the normal pulse amplitude extremes where a malfunction of the angle encoder 16 is to be indicated. Accordingly, between the top amplitude level of each pulse and the supply voltage VCC, there is provided a high trip level $V_{th}$, and between the bottom amplitude level of each pulse and zero, there is provided a low trip $V_{t1}$. See FIG. 3. If the pulse amplitude voltage reaches either one of the trip levels, the malfunction detecting device will indicate a faulty angle encoder.

By arranging a window type amplitude monitoring function there is obtained a safe automatic functional feature for checking the operation of the digital angle encoder. Thereby, it is made possible to use a modern digital type of angle sensing and encoding device without losing the possibility to have a continuous function check of the encoder and to ensure a safe vehicle operation. And should the readings fall outside the window boundaries, the operation of the vehicle is stopped.

What is claimed is:

1. A power steering system for a vehicle having at least one steerable wheel, said power steering system comprising:

a manually operable steering wheel, a first angle sensing device connected to said manually operable steering wheel, a servo motor connected to said at least one steerable wheel, a second angle sensing device associated with the servo motor, and a control unit for receiving signals from said first angle sensing device and for energizing said servo motor, wherein said first angle sensing device comprises a single digital angle encoder arranged to generate electric pulses of a certain amplitude in relation to changes in an angular position of said steering wheel, wherein said control unit provides said single digital angle encoder with a constant supply voltage and includes a malfunction detecting device connected to said single digital angle encoder, wherein said single digital angle encoder comprises a circuit for establishing a constant analog voltage for reducing said certain pulse amplitude normally delivered by said single digital angle encoder to a suitable check amplitude, and wherein a bottom voltage level of each pulse is above zero and a top voltage level of each pulse is below said supply voltage.

2. The power steering system according to claim 1, wherein said certain pulse amplitude extends from zero to said supply voltage, and said constant analog voltage is arranged to reduce said certain pulse amplitude to said check amplitude, which thereby extends from a first voltage level above zero to a second voltage level below said supply voltage.

3. The power steering system according to claim 1, wherein said malfunction detecting device comprises means for providing a high trip voltage level between the supply voltage and said second voltage level, and a low trip voltage level between said first voltage level and zero, and wherein said high and low trip voltage levels and define limit values for indicating malfunction of said single digital angle encoder.

4. The power steering system according to claim 1, wherein said second angle sensing device is arranged to deliver a feed back signal to said control unit for obtaining a correlation between a set pulse number and frequency delivered by said single digital angle encoder and an actual pulse number and frequency delivered by said second angle sensing device.

5. The power steering system according to claim 2, wherein said malfunction detecting device comprises means for providing a high trip voltage level between the supply voltage and said second voltage level, and a low trip voltage level between said first voltage level and zero, and wherein said high and low trip voltage levels and define limit values for indicating malfunction of said single digital angle encoder.

6. The power steering system according to claim 2, wherein said second angle sensing device is arranged to deliver a feed back signal to said control unit for obtaining a correlation between a set pulse number and frequency delivered by said single digital angle encoder and an actual pulse number and frequency delivered by said second angle sensing device.

7. The power steering system according to claim 3, wherein said second angle sensing device is arranged to deliver a feed back signal to said control unit for obtaining a correlation between a set pulse number and frequency delivered by said single digital angle encoder and an actual pulse number and frequency delivered by said second angle sensing device.

8. The power steering system according to claim 5, wherein said second angle sensing device is arranged to deliver a feed back signal to said control unit for obtaining a correlation between a set pulse number and frequency delivered by said single digital angle encoder and an actual pulse number and frequency delivered by said second angle sensing device.

* * * * *